United States Patent [19]

Miller

[11] Patent Number: 5,553,083
[45] Date of Patent: Sep. 3, 1996

[54] METHOD FOR QUICKLY AND RELIABLY TRANSMITTING FRAMES OF DATA OVER COMMUNICATIONS LINKS

[75] Inventor: C. Kenneth Miller, Concord, Mass.

[73] Assignee: Starburst Communications Corporation, Concord, Mass.

[21] Appl. No.: 375,493

[22] Filed: Jan. 19, 1995

[51] Int. Cl.$^6$ .................................................. H04L 1/16
[52] U.S. Cl. ............................................................ 371/32
[58] Field of Search .......................................... 371/32, 33

[56] References Cited

U.S. PATENT DOCUMENTS

| | | | |
|---|---|---|---|
| 4,554,656 | 11/1985 | Budrikis et al. | 370/85 |
| 4,888,767 | 12/1989 | Furuya et al. | 370/95.2 |
| 4,914,654 | 4/1990 | Matsuda et al. | 370/94.1 |
| 5,296,936 | 3/1994 | Pittas et al. | 358/407 |

OTHER PUBLICATIONS

Comer, *Internetworking with TCP/IP, Vol. I, Principles, Protocols, and Architecture*, Second Edition, Prentice Hall, 1991, Chapter 23, pp. 377–390.

Waters, A., et al, "Broadcast File Distribution Protocols for Satellite Networks", IEEE Telecommunications Conf., pp. 133–138.

Henriksen, E., et al, "A Transport Protocol Supporting Multicast File Transfer Over Satellite Links", Int;l. Phoenix Conf. on Computers and Communications, 590–596.

*Primary Examiner*—Stephen M. Baker
*Attorney, Agent, or Firm*—Testa, Hurwitz & Thibeault, LLP

[57] ABSTRACT

A data transmission method quickly and reliably transmits data (e.g., a file) from a source to one or more recipients over a communications link. The method includes transmitting the data, which are in the form of a plurality of frames, from the source over the link to one or more of the recipients until all of the plurality of frames have been transmitted over the link. While the data are being transmitted by the source, acknowledgments from one or more of the recipients are received by the source. The acknowledgments indicate which frames require retransmission. After all of the frames have been transmitted over the link, a retransmission is performed by the source for only those frames which the acknowledgments indicate as requiring retransmission.

10 Claims, 4 Drawing Sheets

METHOD FOR QUICKLY AND RELIABLY TRANSMITTING FRAMES OF DATA OVER COMMUNICATIONS LINKS

FIELD OF THE INVENTION

This invention relates to data transmission, and more particularly, to fast and reliable transmission of files from a server to one or more clients over communications links.

BACKGROUND OF THE INVENTION

Computer networks, such as wide area networks (WANs), can provide unicast, multicast, and broadcast services to allow communication between network participants such as a server node and one or more client nodes. Broadcast frame relay is a service used to communicate over a computer network. Multicast IP technology is another service used to communicate over a computer network. The term "broadcast" refers to a server node sending information to all of the client nodes connected to the network. The term "multicast" refers to a server node sending information to a subset of all of the client nodes connected to the network. Broadcast and multicast are network capabilities which are relatively new over WANs.

Some information providers desire to deliver information electronically by broadcasting or multicasing the information from a server node at a central location to one or more client nodes at remote customer locations via a computer network to which the server and the clients are coupled. Because broadcast and multicast network services do not provide for acknowledgment of the delivered information at all, these services can be unreliable. Such unreliability generally is undesirable and unacceptable to information providers.

A common protocol suite in use in computer networks is TCP/IP, which is the protocol used in the Internet. TCP stands for Transmission Control Protocol, and IP stands for Internet Protocol. Two file transfer protocols are available in association with TCP/IP: (i) File Transfer Protocol (FTP) which runs as an application on top of TCP and (ii) Trivial File Transfer Protocol (TFTP) which runs on top of UDP. UDP stands for User Datagram Protocol. Both TCP and UDP are transport protocols which are responsible for end-to-end delivery of information across an internetwork, i.e., a network of networks.

Both FTP and TFTP support point-to-point (i.e., unicast) file transfers only. FTP depends on TCP for reliable delivery, as TCP is a connection-oriented acknowledged transport protocol. TFTP provides its own acknowledgments for reliability, as it runs on top of UDP which is a connectionless transport service that does not support acknowledgment.

Connection-oriented protocols such as TCP require setup and tear-down of virtual circuit connections. This requires significant handshaking to set up the connection, and is not desired in some networks that are inherently connectionless oriented. An example of a network which is inherently connectionless oriented is a wireless data networking technology called Cellular Digital Packet Data (CDPD). CDPD is being deployed rapidly by the cellular carriers in North America, Latin America, and parts of the Far East. CDPD utilizes TCP/IP as the primary protocol suite used in the network. One feature of the network is channel hopping, where data channels attempt to hop away from cellular voice channels. Additionally, subscribers to wireless services are mobile, meaning a particular session may have the transmission path change as the user enters a new cell area, for example. Both situations defeat the concept of a virtual circuit, which attempts to keep a fixed path for the virtual circuit after call setup. Additionally, wireless channels are usually bandwidth constrained with higher error rates than wireline channels, so overhead should be kept to a minimum. This means that CDPD wireless networks recommend applications operate over UDP (the connectionless transport layer) only. Thus, TFTP is the file transfer protocol of choice for CDPD.

TFTP breaks files up into packets having 512 bytes of data each, and it then sends each data packet one at a time. After each data packet is sent, TFTP causes the sending node to wait for an acknowledgment from the receiving node(s) before the sending node is allowed to send the next data packet. TFTP is described, for example, in a book by Douglas E. Comer (*Internetworking with TCP/IP, Volume I, Principles, Protocols, and Architecture, Second Edition*, Prentice Hall, 1991, Chapter 23, pages 377–390).

While acknowledgment is a part of TFTP, the acknowledgment scheme used in TFTP becomes very inefficient as network delay becomes significant and/or is different for two or more of the receiving nodes. Like TFTP, some other known data transfer mechanisms require packet-by-packet acknowledgment, and thus these other mechanisms also are relatively slow at transferring the entire amount of data.

SUMMARY OF THE INVENTION

It is an object of the present invention to provide both fast and reliable transmission of files from a server to one or more clients over a communications link. The file transfer preferably is a broadcast or a multicast transmission to all or a plurality of the clients. In general, file transfer according to the invention will not suffer any reduction in speed, reliability, or efficiency in the face of link delay, even if that delay is significant and/or different for two or more of the receiving clients. The invention provides an ideal mechanism for distributing computer software files electronically.

The communications link, which couples the server to the clients and allows communication therebetween, can be a computer network (e.g., a LAN, a WAN, the Internet), a wireless network (e.g., a packet cellular data network such as CDPD), some combination of these types of communication mediums, or some other communication medium.

In accordance with the invention, the clients send acknowledgments back to the server as the server is sending the data files. The communication is continuous. That is, the server does not stop sending the data to wait for acknowledgments from the clients, but instead the server receives the clients' acknowledgments as the server is transmitting the data. The clients' acknowledgments indicate to the server which particular packets need to be resent. A packet may need to be resent because, for example, it was either not received or received in error by one or more of the clients. After the server has sent the entire amount of data (e.g., the entire file) over the link to the clients, the server performs a second round of transmissions in which it only resends the particular packets indicated by the clients as requiring retransmission. During this second round, clients only acknowledge packets not received, or not received correctly, during the previous round. The process can then continue with as many additional rounds of retransmissions as is required so that each of the clients correctly receives all of the packets. Alternatively, the retransmission rounds can be repeated a predetermined number of times, which number can be modified (i.e., the number is configurable). Each subsequent round typically involves the transmission of fewer packets than the previous round, as only previous packets in error are resent.

This scheme quickly and reliably transfers data from a server to one or more clients. It is quick because the server is allowed to transfer the entire file without stopping at packet boundaries to wait for acknowledgments from the clients for the packet just sent. That is, data transfer is not directly tied to acknowledgments in that each round of data transfer continues regardless of any particular client's reception problems and/or regardless of any link delay issues (e.g., a difference in the time it takes a packet to travel from the server to a certain client and the time it takes a packet to travel from the server to another different client). Also, each subsequent round of transmission only involves the sending of packets which were not received, or received in error, during the previous round, and therefore the server generally does not ever need to send the entire file more than once. It is reliable because it strives to provide each client with every packet, and the reception problems of any individual client generally does not affect the other clients' reception speed and accuracy.

In a preferred embodiment of the invention, the entire amount of data to be transferred (e.g., a file) is separated into a plurality of blocks, where each block includes a plurality of packets. The server completes a round when it finishes transmitting all blocks (e.g., the entire file). After a complete block has been transmitted, the clients send their acknowledgments back to the server via a return unicast communications path. Block boundaries trigger the sending of acknowledgments by the clients. As the acknowledgments are coming into the server from the clients for block N, the server is transmitting block N+1 (or a subsequent block) out to the clients or the server has finished transmitting all of the blocks.

It is noted that the terms 'packet', 'datagram', and 'frame' are used interchangeably herein to identify the same thing, namely a unit of data or information which may have a source and destination address as part thereof and which is sent across the link.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DESCRIPTION

Figure 1:
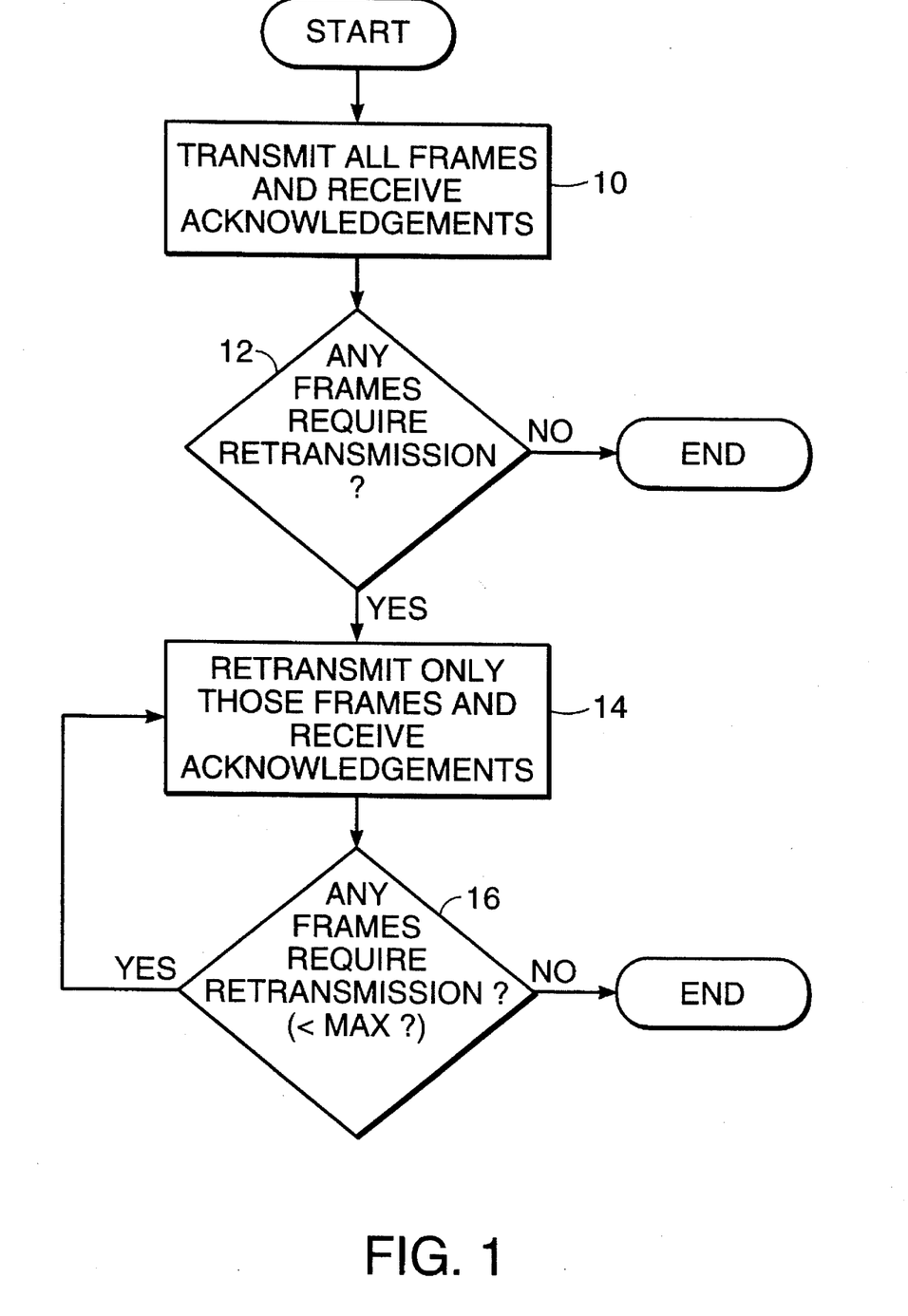
FIG. 1 is a flowchart of data transmission operations according to the invention.
Figure 2:
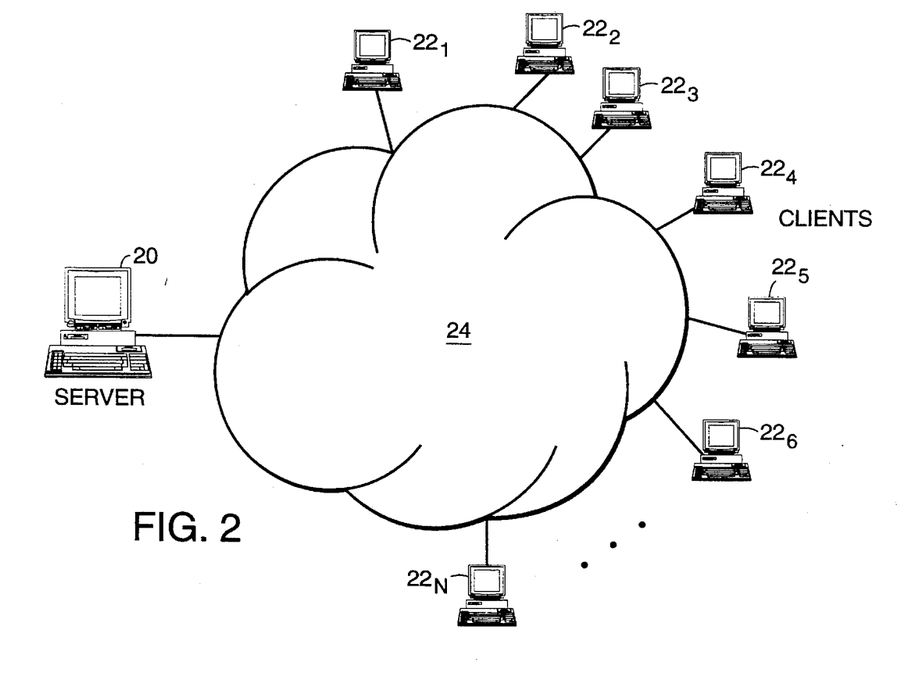
FIG. 2 is a diagram of a physical configuration which allows a server to communicate with one or more clients.

Referring to FIGS. 1 and 2, in accordance with the invention, quick and reliable data transmission from a source or server 20 to one or more recipients or receivers or clients $22_1, 22_2, \ldots, 22_N$ over a communications link 24 comprises (step 10) transmitting the data (e.g., a file), which is in the form of a plurality of frames, over the link 24 to one or more of the recipients 22 until the entire file (i.e., all of the plurality of frames) have been transmitted over the link 24. As the frames are being transmitted, frame acknowledgments from one or more of the recipients 22 are received via the link 24 (step 10). If, after the entire file has been transmitted over the link 24, the acknowledgments indicate that certain frames need to be retransmitted over the link 24 (step 12), only those certain frames are retransmitted (step 14). As those certain frames are being retransmitted over the link 24, frame acknowledgments from one or more of the recipients 22 are received via the link 24 (step 14). This process is then repeated as many times as necessary until no more frames need to be retransmitted, as indicated by steps 14 and 16. Alternatively, as indicated in step 16, the process can be stopped either when the number of passes through step 14 equals a maximum allowable value or when a maximum time is met or exceeded. If it is determined at step 12 or step 16 that no frames need to be resent, the process ends (which ending could occur before MAX is reached). The initial transfer of the entire file and each of the subsequent transmissions of error frames are generally referred to herein, as a "round" or "pass".

In the first pass, the server 20 preferably either broadcasts the file to all of the clients 22 or multicasts it to a subset of all of the clients 22. At least two of the clients 22 typically have a different server-to-client frame transmission delay associated therewith. Data transmission according to the invention is uneffected by such delay differences even if significant and even if every client 22 has a different delay associated therewith.

The link 24 can be a computer network (e.g., a LAN, a WAN, the Internet), a wireless network (e.g., a cellular data network), some combination of these two types of communication mediums, or some other communication medium. The plurality of frames transmitted over the link 24 during the first round can together represent a computer data file being transferred from the server 20 to one or more of the clients 22.

Figure 5:
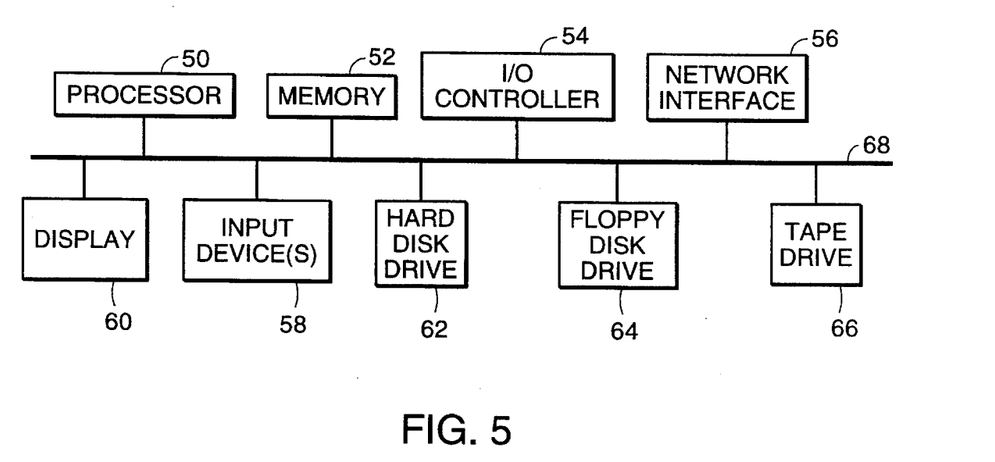
FIG. 5 is a simplified block diagram of a server in which at least a portion of the present invention can be embodied.

The server 20 and the clients 22 can be computers, such as PCs or workstations, running any one of a variety of operating systems including DOS. Referring to FIG. 5, the server 20, regardless of what type of computer it is, typically includes a central processor 50, a main memory unit 52 for storing programs and/or data, an input/output controller 54, a network interface 56, one or more input devices 58 such as a keyboard and a mouse, a display device 60, a fixed or hard disk drive unit 62, a floppy disk drive unit 64, a tape drive unit 66, and a data bus 68 coupling these components to allow communication therebetween. Each of the client computers 22 generally includes all or some of the components included in the server 20 of FIG. 5.

In some embodiments, one or more computer programs define the operational capabilities of the server 20 and the clients 22. The programs can be loaded into the server 20 and the clients 22 via the hard drive 62, the floppy drive 64, and/or the tape drive 66. Alternatively, the programs can reside in a permanent memory portion (e.g., a ROM chip) of the main memory 52. In some other embodiments, the server 20 and/or the clients 22 can include specially-designed, dedicated, hard-wired electronic circuits which perform all functions described herein without the need for instructions from computer programs. The invention can be used, for example, to load quickly and reliably new revision levels of the client software electronically from the server onto one or more of the clients.

Figure 3:
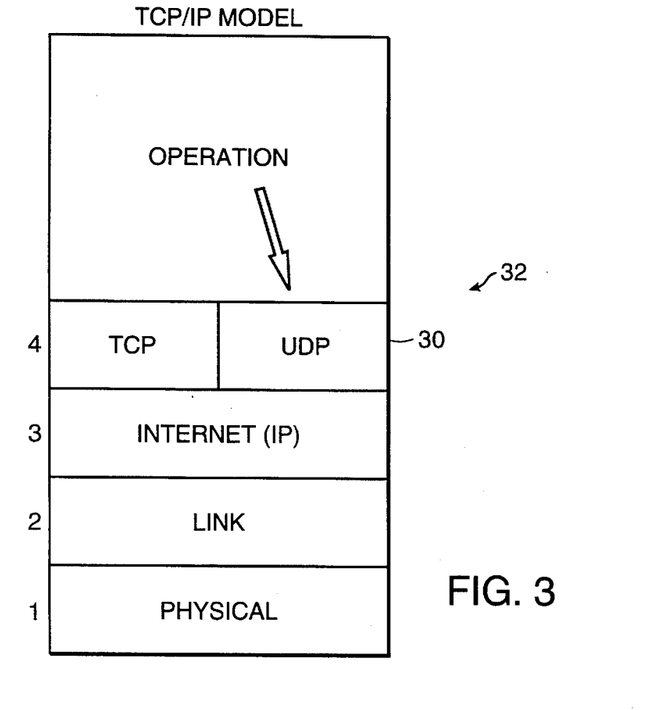
FIG. 3 is a diagram showing the location of an embodiment of the invention in relation to the TCP/IP protocol stack.

Referring to FIG. 3, the invention preferably operates at the application layer 30 of the TCP/IP protocol stack 32 on top of UDP. The invention also could operate at the application layer above the connectionless transport layer present in other protocol stacks such as IPX in the NetWare SPX/IPX protocol suite. UDP stands for User Datagram Protocol, and it is the TCP/IP standard protocol that allows an application program on one computer to send a datagram to an application program on another computer. UDP uses the Internet Protocol (IP) to deliver datagrams. UDP datagrams differ from IP datagrams in that UDP datagrams include a protocol port number which allows the sender of the datagram to distinguish among multiple destinations (i.e., application programs) on the receiving computer. UDP datagrams also typically include a checksum for the data being sent.

In general, data transmission according to the invention includes four aspects: IDLE, ANNOUNCE/REGISTRATION, TRANSFER, and COMPLETION. In the IDLE state, there is no activity. When a collection of data (e.g., a file) is selected for transmission by the server 20, the ANNOUNCE/REGISTRATION phase is entered. During any of the four phases, all files are available to an operator at the server 20.

ANNOUNCE/REGISTRATION

In this phase, the server ANNOUNCES to the clients that a file is about to be transferred and provides the parameters associated with the transfer of the file. The maximum duration of this phase is expressed in minutes, and it is configurable.

Clients are obliged to register with the server that they received an ANNOUNCE message. When a client sees the ANNOUNCE message, the client verifies that it is associated with the group identified in the message. It is implicit in the receiver being able to process the ANNOUNCE message that the receiver has a correct server IP address and a correct port number. The clients automatically respond to ANNOUNCE packets with REGISTRATION packets until they see their address in a registered client list in a subsequent ANNOUNCE packet. The REGISTRATION packet acts as a positive acknowledgment to the server about the client's participation. Once the server receives the client's REGISTRATION packet, the server adds the client to the client list in the next broadcast of the ANNOUNCE packet. The client list is maintained by the server, but it is not shown in any of the drawings. When the client receives an ANNOUNCE packet with the client's ID in the client list, registration for the client is complete. When all expected receivers have responded to the ANNOUNCE message, the announce time remaining will be set to zero and actual transmission of the file will begin after a final announce interval. This registration indicates that the client can participate in the group, as it has the resources to handle the file about to be sent. To prevent unwanted participation, encryption key exchange can take place at group setup.

Once file transfer begins, ANNOUNCE packets continue to be sent. This allows for the possibility of late registration. Because coordination of start can be hampered by many uncontrolled aspects, even differing time zones, participation should be allowed as long as the group would not be appreciably impeded by the late registration. If a client starts participation just after the file transfer begins, the impact on the group would be minimal and registration should be allowed. ANNOUNCE packets continue to be sent until any client responds with a COMPLETION packet. COMPLETION is described hereinafter. If clients are close to completion, adding a new client would delay completion of the group by more than an acceptable period. For example, if a perfect transfer takes two hours, then one pass through the file would probably be successful for one client at least. A late registration would require anyone else in the group to wait potentially for a full transfer. The group members may only need to wait for considerably less to complete. Also, rejection of late transfer may allow the server to create a list of clients that can perform the transfer at a later time with a unicast transmission.

Throughout this period, ANNOUNCE packets will be transmitted at an interval which is configurable.

All the characteristics of the transmission are transmitted in the ANNOUNCE packet.

On receiving this ANNOUNCE message, the client responds with a unicast datagram to the server. The response indicates whether or not the receiver has the facilities to receive the file. It also indicates, in the case of an aborted transmission, whether the client has enough context to resume the transmission. The duration of the announce period in some instances should allow for an operator at the server site to initiate a call to the client site indicating that the computer is either not available or does not have the facilities for the transfer. At the client site, the corrections could be made either manually or, if so configured, under remote control from the server to free up resource so it can participate in the transfer.

At any point in time throughout the transmission, the client may respond to this packet indicating that they aborted the transmission from their end indicating the reason in the message.

TRANSFER

Upon entering the data transfer phase, a transmission log is initiated and maintained at the server. This log, however, is not shown in any of the drawings. Each of the clients also maintains a transmission log, but it also is not shown in any of the drawings. The log maintained at each of the clients is mentioned hereinafter under the "COMPLETION" heading.

As files having 50 to 100 megabytes of data or more can be transferred, holding the entire file in memory at the server for the extent of the transfer generally is unrealistic. The number of clients which are to receive the file can be one thousand or more, and thus waiting for acknowledgments from each of them before continuing on to the next block transfer is unacceptable.

Figure 4:
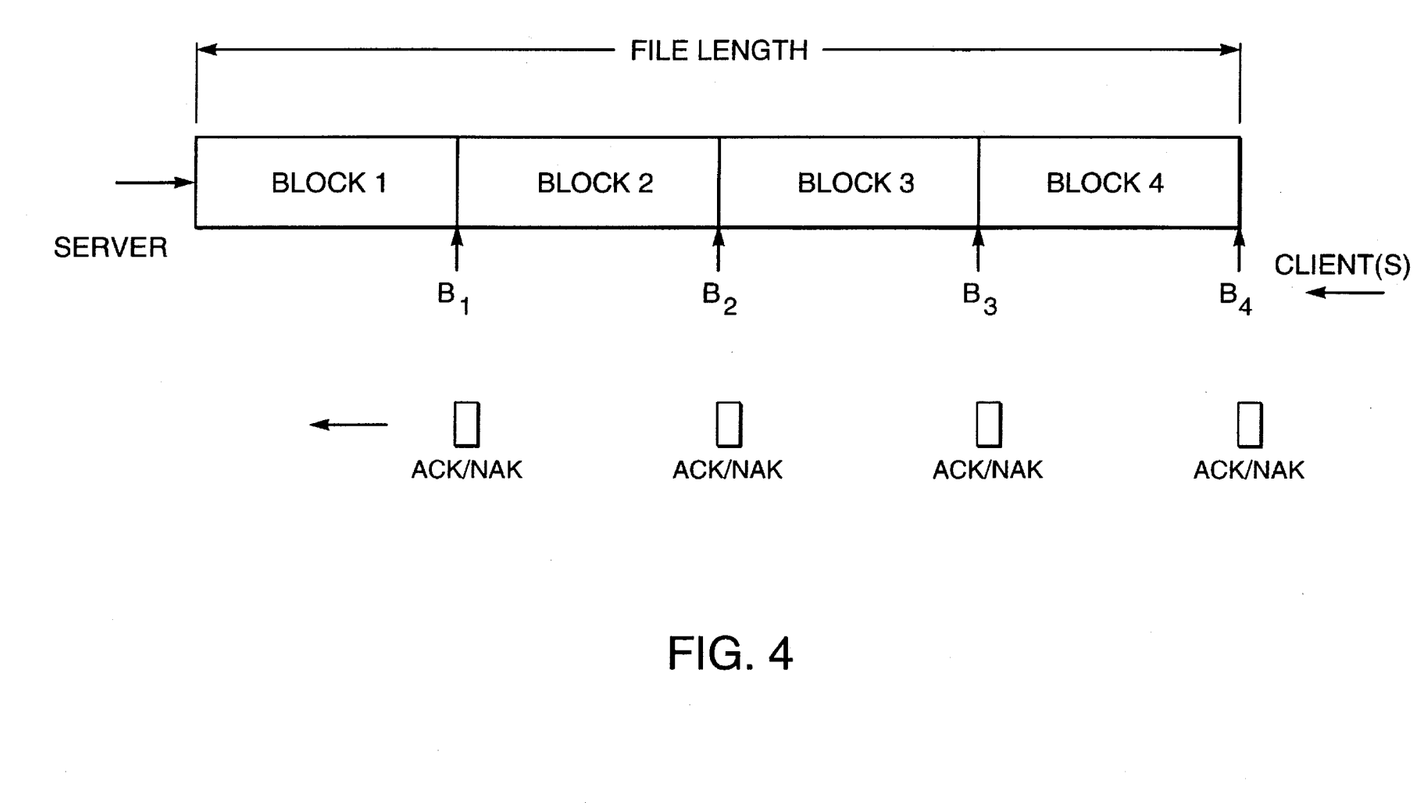
FIG. 4 is a diagram of a "first pass" block and frame transmission and acknowledgment process according to the invention.

The server logically breaks each file to be transferred into blocks of frames, and each block typically includes a plurality of frames and possibly thousands of frames. Referring to FIG. 4, in one example, the server 20 has broken a file into four blocks, namely, Block 1, Block 2, Block 3, and, Block 4, wherein each block includes one or more frames. Each block represents a unit that will be positively or negatively acknowledged by every client participating in a transfer when the client determines that a block has been sent by the server. The client detects this by a change in block number in data packets received, because each frame sent indicates its block number and its frame number within that block. Breaking the file into blocks provides at least two advantages: (i) decreasing the number of acknowledgments required and (ii) reducing the memory requirements in the server for determining next file pass transfer blocks.

Data transfers are not directly tied to acknowledgments. Transfer continues regardless of missed acknowledgments or previously missed data packets by any individual client. This allows simplicity of design and ensures that individual client problems provide minimal impact on the group as a whole. Note also that clients are responsible for sending block acknowledgments based on what they hear from the server.

Referring to FIG. 4, the server starts the transfer by sending the first frame of the first block (i.e., the first frame of $Block_1$). The server sends the frames at a rate that is configurable. This represents the basic transfer rate that may be throttled back (i.e., decreased) based on performance. The server continues sending the frames of the file until the complete file has been sent once into the network (i.e., until $Block_1$ through $Block_4$ are sent). This is defined as the first pass or first round, and it takes an amount of time represented in FIG. 4 as "$B_4$". Some clients may receive the complete file (i.e., all four blocks) correctly after the first pass, in which case they have finished receiving the file. Clients receiving one or more frames in error, or not receiving one or more frames at all, require the resending of certain "pieces" of the file (i.e., the erroneously-received or missed frames) on subsequent passes or rounds. Each subsequent pass requires the transmission of fewer frames because only frames not received (or received in error) in the previous round get retransmitted in the next round.

The maximum pass count or the maximum time to complete (FIG. 1) is a configurable parameter. There may be clients that have not received all of the file correctly by the time of the maximum pass or the maximum time duration. These clients are identified by the server, and the server can take further action to get these clients the rest of the information via, for example, a unicast file transfer process.

As the server passes block boundaries (i.e., $B_1$, $B_2$, $B_3$ and $B_4$ in FIG. 4), the individual clients send "block positive" acknowledgments ("Ack" in FIG. 4) and "selective reject negative" acknowledgments ("Nak" in FIG. 4) for each block. The acknowledgments from the clients for each block are received at the server sometime after the boundary of that block is passed. A "block positive" acknowledgment for a particular block means that particular block was received correctly in its entirety at the client. A "selective reject negative" acknowledgment for a particular block means that some or all of the frames in that particular block were received in error, or were not received at all indicating that the network did not deliver them. Because of the possibility of frames being received out of order, a dropped frame is declared if five or more frames after it are received and it is not. Thus, selective reject negative acknowledgments (also referred to herein as negative acknowledgments) indicate which frames were received in error or not received.

On subsequent passes (i.e., after the first pass shown in FIG. 4), clients only respond with acknowledgments for blocks not previously received correctly on previous passes. Since the server sends pieces (frames) of the file needed by various clients to all clients in subsequent passes, many of the clients will have already received it correctly on the first pass and do not have to acknowledge reception again.

In general, all information returning back to the server from the clients may be transmitted on a return path which is separate from the path(s) which the server uses to transfer the frames to the clients. However, for the purposes of this description, the communications link 24 (FIG. 2), or other path which allows the server and the clients to communicate, should generally be taken to mean both the server-to-client link and the return client-to-server link.

The server maintains various information about the transfer and the participants in the transfer. In the preferred embodiment, this information is maintained by the server in the form of data structures or lists. The server maintains and uses this information to record and determine the status of the file transfer.

Referring to Table 1, a client status structure is maintained by the server. This client status structure includes a list of the status of the participants of the broadcast or multicast group based on data from the announce registrations that are received by the server. (Announce registration is described herein, for example, under the ANNOUNCE/REGISTRATION heading). The client status list can indicate, for example, unregistered clients and aborted clients. The client status list generally includes an entry for each client included in the broadcast or multicast group, and the number of clients which can be tracked in the client status list can number in the thousands. For example, it might be, as shown in Table 1, that the first client (e.g., client $22_1$ of FIG. 2) has aborted while most other clients in the group are registered.

TABLE 1

| Client Status |
|---|
| Client 1 - Aborted |
| Client 2 - Registered |
| Client 3 - Registered |
| Client 8 - Registered |
| Client 12 - Registered |
| Client 13 - Registered |
| . |
| . |
| Client N - Registered |

TABLE 2

| Frame Status |
|---|
| Block 1, Frame 20 |
| Block 1, Frame 25 |
| Block 2, Frame 10 |
| Block 2, Frame 22 |
| Block 2, Frame 24 |
| Block 9, Frame 3 |
| Block 9, Frame 5 |
| . |
| . |

TABLE 3

| Last Heard |
|---|
| Client 1 - XA seconds |
| Client 2 - XB seconds |
| Client 3 - XC seconds |
| Client 8 - XD seconds |
| Client 12 - XE seconds |
| Client 13 - XF seconds |
| . |
| . |
| Client N - ZZ seconds |

Note that the subscript "N" is used here and in other places in this description, but it does not necessarily represent the same integer each time it is used. For example, there are not necessarily the same number of clients shown in FIG. 2 as there clients listed in the tables above.

Referring to Table 2, the server also maintains a frame data structure which indicates all selective rejects on individual frames from all clients. If multiple clients missed the same frame, the frame data structure would indicate only that the frame was missed. That is, the frame data structure is not maintained on a client-by-client basis by the server. It generally is undesirable for the server to maintain a list of missed frames on a per client basis because such a scheme would use an inordinate amount of memory, particularly when a large number (e.g., one thousand or more) of clients are involved in the broadcast or multicast. For example, it might be, as shown in Table 2, that one or more of the clients either did not receive or received in error frames twenty and twenty-five of $Block_1$, the three frames indicated of $Block_2$, frame one of $Block_9$, etc. If the frame status maintained by the server indicates that a particular frame of a particular block needs to be retransmitted, it will be true that at least one of the clients has not acknowledged successful completion of that particular block. After the server has sent the entire file once, the server would then pass through the frame status information and resend only the frames listed therein. This would continue, pass after pass, until all clients had positively acknowledged all blocks and the frame status list is empty (or the maximum number of rounds, or maximum time, had been reached as indicated in FIG. 1).

A third piece of information that the server maintains about the file transfer, as shown in Table 3, is a LAST_HEARD_FROM time indication for each client. For example, the server might not have heard from the first client (e.g., client $22_1$ of FIG. 2) for XA seconds, the second client (e.g., client $22_2$ of FIG. 2) for XB seconds, and the last client (e.g., client $22_N$) for ZZ seconds. Also, each client maintains a similar LAST_HEARD_FROM time indication for the server, but this client list is not shown in any drawing or table. Maintenance of this parameter allows either end to abort participation if the other end has dropped out for a period of time which exceeds a configurable timeout period.

Note that for any given pass, if any acknowledgment does not get back to the server, the client will send back to the server the same reject and retransmission request messages during the next pass by the server. This means that if a certain client is not being heard by the server, that client will have to participate longer but that client will not appreciable impact the rest of the receiving clients.

A fourth piece of information stored at the server is statistics on the broadcast or multicast group. When a transmission is completed, summary information is provided on the transmission that can aid an operator in determining system performance problems and/or the performance problems of a particular client.

In addition, the server gets a good indication of congestion by the number of acknowledgments not getting back, and the server can then throttle back (i.e., decrease) the file transfer rate. When the acknowledgments arrive at a better rate, the server can throttle forward again. The invention thus provides simple and effective congestion control.

Asynchronous Selective Acknowledgments

Asynchronously throughout the transmission, the server performs a process which selectively queries the clients for block acknowledgments which have not been received by the server with unicast packets. The frequency of these requests is a configurable parameter.

This asynchronous process from the server will send unicast selective ack request messages to solicit responses from individual clients which have not responded. The responses are in the form of a standard response message. They will contain the range of blocks to acknowledge up to the block requested along with a bitmap describing the specific block in error if there are errors to report.

Multiple Passes Through the File

Once the file has been completely processed once (i.e., after the first pass or round), the transmission process according to the invention will increment a pass counter and then scan the frame status list (Table 2) for the first block in which there was an error. Upon finding this first-error block, the server will resend the missed packets in that block. Acknowledgments for these missed packets will, as described previously, be generated by the clients when they detect an error in a block. This is consistent with the first pass. All block positive acknowledgments and selective reject negative acknowledgments are indications of state and are therefore not specific to a pass though they may change with each pass. In a preferred embodiment, the selective reject negative acknowledgments are in the form of bitmaps where the entire word represents a block and each bit in that word represents a different one of the frames which make up that block.

Transmission Abort

If, during the transmission, a fault is encountered which cannot be rectified, or if the operator manually aborts, a transmission abort sequence will be initiated. This sequence entails the repeated transmission of an Abort message for a certain interval (e.g., for an interval which is specified in a transmissions file). The receivers acknowledge the abort message and can take action to, for example, either save the context for a potential resumption of the transfer or reinitialize the context to prepare for another transmission.

There is a facility which allows the user to initiate a transmission abort. A reason code can be set to either suspend or initialize. In former case, the transmission may be resumed at a later time, and, in the latter case, the clients will be requested to reinitialize their contexts.

COMPLETION

The server detects completion of individual clients by receiving a positive block acknowledgment for all blocks. The client knows it's done as soon as it has all blocks of the file, but the client must continue to send acknowledgments until the server confirms completion.

When the server determines that a client has completed reception of the file, the server sends an ANNOUNCE_COMPLETION packet. This packet replaces the original ANNOUNCE packet and also signals the end of late registration. Once a client receives the announce completion packet, that client can stop participating in block acknowledgments. The client will then update its transmission log to indicate that the transfer has been successfully completed.

An ability to abort a transfer from the server or client is included. An abort packet provides the server and client with the ability to prematurely abort a transfer. If the client sends an abort, the server initializes the client until the client reregisters. If the server aborts, the transfer can be restarted without sending the full file on the first pass by having the server make one pass requesting block status from all clients and then starting with the returned rejections. The clients read the previous transfer and determine which blocks were missing or in error.

When a single pass has been made through the file, certain clients will be considered to have completed. As each completes, they will generate a complete message to the server. The server will regularly send out a transmission complete message which references the addresses that the server recognizes are complete.

Congestion

If the packet error rate for the block exceeds a threshold level of errors per block in aggregate across the set of clients or if there are specific packets which are dropped by a configurable percentage of the clients, then congestion is indicated. These two factors comprise an error level in the transmission. Initially, however, the error level will be represented by the gross percentage of frame errors reported per block. In managing congestion, the transfer rate will be stepped down until the error level as indicated by negative acknowledgments shows improvement.

To avoid bouncing the transfer rate after each block, the congestion algorithm should allow for 2 congestion error levels. The first is the threshold for invoking congestion, and the second represents the error level to which the transmission should improve to before turning congestion management off.

The server will manage congestion by throttling back on the rate at which it sends out frames. It will step down the transfer rate each time it detects congestion. The step down will take the congestion level which ranges from 1 to 8, multiply it by 2, and then divide the current transfer rate by the product (i.e., "Current Transfer Rate" divided by "Congestion Level * 2"). Note that a congestion level of zero indicates no congestion.

Multicast

Multicast can be in two forms: pseudo-multicast where the network still delivers data to the entire broadcast group, and multicast IP where the network routes traffic based on multicast routers and Internet specification RFC 1112 is implemented in the clients.

In both cases, multicast groups are set up under initiation of the server. The server sends notifications on a unicast basis to clients to inform them of membership in a particular multicast group. These multicast groups can be set up and dismantled rapidly, allowing for a dynamic configuration of multicast groups. For example, a multicast group could be set up to be only in place for the transmission of a particular file, after which time the group was dismantled.

With pseudo-multicast, the network still delivers traffic on a broadcast basis, but clients not in the group discard the data not destined for it. When the group is set up, security keys are also disseminated so that clients outside the group cannot read the data even if it happened that the data was not discarded at that node. Also, with pseudo-multicast, the IP address remains 255.255.255.255 which is the normal IP broadcast address. As with broadcast, this address becomes mapped to a broadcast DLCI. A multicast header is selected for the group and becomes the group differentiator.

With multicast IP, the network is a router network where the routers support Class D multicast IP addresses and multicast routing. The clients support RFC 1112, "Host Extensions for IP Multicasting". RFC 1112 provides for host notification of their presence to the nearest multicast router for the purpose of update of router tables.

A functional description of the above-described invention is provided below.

Referring back to FIG. 2, a purpose of the invention is to enable the simultaneous transmission of small or large data files (e.g., files up to 100 megabytes or more in size) by a server 20 to up to 1000 or more receiving nodes 22 over a wide area network (WAN) connection 24. The invention also is able to work over local area networks and other types of communications links, as described previously. The transmission medium 24 can be a broadcast frame relay network provided by a carrier. The receiving nodes 22 on the network 24 can be located on an Ethernet LAN and attached to a router. The broadcast group can be addressed using the 255.255.255.255 broadcast IP address which can be mapped to the broadcast Ethernet address, which can be mapped to a broadcast frame relay DLCI. The router in this case can act as a bridge for this traffic. Alternatively, the server can be interface directly to a broadcast frame relay DLCI.

Multicast can be supported in two ways: pseudo-multicast and multicast IP, as mentioned previously.

Files to be transferred to the clients can be loaded onto the server 20 via tape (e.g., the tape drive 66 of FIG. 5) or, if the files are small enough, by floppy (e.g., the floppy drive of FIG. 5). Also, files to be transferred can be loaded onto the server 20 via FTP (File Transfer Protocol) from the source of the file over a LAN or other network, for example. The files generally can be in any format. The data file is then read in from the tape or floppy into a file system of the transmission server 20. Note that the server 20 must have sufficient space available to read in an uncompressed copy of the data file. For pseudo-multicast service, the data file also can be encrypted so that noneligible receivers cannot receive and use the data file. Each transmission file preferably is uniquely identified. There preferably is an indication as to its content and time of generation. The input files to the process can be over 100 megabytes in size, and the system can also handle files much larger than 100 megabytes.

The file can then be stored on the server 20 and prepared for transmission. Data from previous transmissions will need to be readily available on the server 20 for some period of time in case they need to be retransmitted. A mechanism for accessing the data is provided such that the data can be readily queued-up for retransmission.

When the file is encrypted, it can be transmitted. For efficiency, the file is transmitted in blocks. The size of a block is derived from the largest packet which can be transferred over the communications path 24. Its derivation is based on the fact that the clients will need to indicate to the server which of the packets in a block they failed to receive. One way, and generally the simplest way, to do this is to send a bitmap indicating by a bit setting positionally which packets were not received. The size of the block therefore is approximately the number of packets which can be acknowledged in a bitmap which itself can be contained in a packet. For example, if the packet size were 256 bytes, then the most bits a packet could contain would be 256(bytes/packet) * 8 (bits/Byte)=2048 (bits/packet) which means that the largest allowable block size would be a block having 2048 packets.

Although receiving nodes 22 can be interfaced to an Ethernet LAN at 10 Mbps, the WAN frame relay links are often of much lower speeds than that. Thus, an explicit transmit data rate is settable/configurable, and an automatic flow control is provided in the event of congestion, as mentioned previously. The user is alerted when congestion is invoked.

Receiving nodes can each experience resource problems either prior to or during a transmission. Receiving nodes are enabled to query their resources prior to a transmission and determine if they have the facilities to receive the data. If not, then they should either reinitialize space which is dedicated for the transmission or should indicate that they cannot participate in the transmission and corrective measure can be undertaken through different channels. A facility is provided where the server can force the availability of disk space remotely, to allow the transfer of the file to take place.

The receivers 22 must also be aware of what they are listening for. When a datagram is received on a dedicated channel, the node 22 must determine if it is being addressed. An issue can arise when this application is being used by more than one transmission server 20. There must be a way of guaranteeing that a receiving node 22 is participating in exactly one transmission at a given time. By dedicating a UDP port to a server 20 and also relating an encryption key to that server, it is ensured that a receiving node employing a promiscuous mode tap on the network 24 will not have the ability to be able to interpret the transmitted data.

Some reference information is maintained on the transmission server 20. There preferably is a list of all the potential receiving nodes in the network. Enough reference information preferably is available to allow the information provider to manage the clients in the case of service failures, problems, etc. There preferably will be a transmission database where an encrypted compressed data file is maintained ready for transmission. The transmission database contains the prepared data along with descriptive information of up to, for example, 70 bytes identifying the content of the files.

Each transmission preferably has a completion status indicator record and a log of all errors encountered during the transmission. There preferably also is an event file with a list of all the nodes for which the transmission failed, who to call, and why it failed.

At any point in time during the transmission, an operator is able to interrogate the status of the transmission as it applies to the server 20 and each of the receiving nodes 22. Alerts are generated if there are problems communicating to certain clients or other problems. If any intervention is indicated, the operator is allowed to initiate the corrective action.

For ongoing maintenance and management of the service, the operator is enabled to maintain the list of receivers, transmission groups, transmission file descriptors, transmission parameters, and transmissions database. A background process will maintain the environment and both age data and delete it according to housekeeping parameters, if enabled by an alerted operator.

Variations, modifications, and other implementations of what is described herein will occur to those of ordinary skill in the art without departing from the spirit and the scope of the invention as claimed. Accordingly, the invention is to be defined not by the preceding illustrative description but instead by the following claims.

What is claimed is:

1. A method for transmitting data over a communications link, comprising:

(A) partitioning the data into a plurality of blocks, each block including a plurality of frames;

(B) transmitting all of the frames to one or more recipients;

(C) during transmission, receiving acknowledgments from the recipients which include indications of frames requiring retransmission; and (D) repeating steps (B), (C), and (D) for only those frames which the acknowledgments indicate require retransmission.

2. A method for quickly and reliably transmitting data to at least two recipients over a communications link comprising:

(A) transmitting a plurality of frames of data over the link to the recipients until all of the plurality of frames have been transmitted;

(B) while performing step (A), receiving acknowledgments from one or more of the recipients, the acknowledgments including indications of frames requiring retransmission; and (C) after all of the plurality of frames have been transmitted, repeating for a predetermined number of times steps (A), (B), and (C) for only those frames which the acknowledgments indicate require retransmission.

3. A method for quickly and reliably transmitting data to at least two recipients over a communications link comprising;

(A) transmitting a plurality of frames of data over the link to the recipients until all of the plurality of frames have been transmitted;

(B) while performing step (A), receiving acknowledgments from one or more of the recipients, the acknowledgments including indications of frames requiring retransmission; and (C) after all of the plurality of frames have been transmitted, repeating until a predetermined amount of time has passed steps (A), (B), and (C) for only those frames which the acknowledgments indicate require retransmission.

4. A method for quickly and reliably transmitting data to at least two recipients over the Internet, comprising:

(A) transmitting a plurality of frames of data over the Internet to the recipients until all of the plurality of frames have been transmitted;

(B) while performing step (A), receiving acknowledgments from one or more of the recipients, the acknowledgments including indications of frames requiring retransmission; and (C) after all of the plurality of frames have been transmitted, repeating steps (A), (B), and (C) for only those frames which the acknowledgments indicate require retransmission.

5. A method for quickly and reliably transmitting data to at least two recipients over a cellular network, comprising:

(A) transmitting a plurality of frames of data over the cellular network to the recipients until all of the plurality of frames have been transmitted;

(B) while performing step (A), receiving acknowledgments from one or more of the recipients, the acknowledgments including indications of frames requiring retransmission; and (C) after all of the plurality of frames have been transmitted, repeating steps (A), (B), and (C) for only those frames which the acknowledgments indicate require retransmission.

6. A method for quickly and reliably transmitting data to at least two recipients over a communications link, comprising:

(A) grouping a plurality of frames of data into a plurality of blocks, each block including a plurality of the frames and the number of blocks being less than the number of frames;

(B) transmitting each of the frames of each of the blocks over the link to the recipients until all of the plurality of blocks have been transmitted;

(C) while performing step (B), receiving acknowledgments from one or more of the recipients, the acknowledgments including indications of frames requiring retransmission; and (D) after all of the plurality of blocks have been transmitted, repeating steps (B), (C), and (D) for only those frames which the acknowledgments indicate require retransmission.

7. The method of claim 6 wherein step (C) comprises receiving the acknowledgments wherein each acknowledgment comprises either a positive acknowledgment or a negative acknowledgment, the positive acknowledgment indicating that a particular one of the blocks was received correctly in its entirety by a particular one of the recipients, the negative acknowledgment indicating that a particular one of the recipients requires that one or more of the frames from a particular one of the blocks be retransmitted.

8. The method of claim 7 wherein step (C) further comprises receiving the acknowledgments for a particular one of the blocks only after all of the frames of that particular block have been transmitted over the link.

9. The method of claim 8 wherein step (B) further comprises transmitting the frames at a predetermined rate.

10. The method of claim 9 further comprising determining which, if any, recipients are not acknowledging transmissions and then adjusting the predetermined rate based on that determination in order to increase recipient transmission acknowledgment.

* * * * *

REEXAMINATION CERTIFICATE (4085th)

United States Patent [19]
Miller et al.

[11] B1 5,553,083
[45] Certificate Issued May 16, 2000

[54] METHOD FOR QUICKLY AND RELIABLY TRANSMITTING FRAMES OF DATA OVER COMMUNICATIONS LINKS

[75] Inventors: C. Kenneth Miller, Concord; Kary Robertson, Newburyport, both of Mass.; Kenneth Cates, Salem, N.H.; Marc White, Wayland, Mass.

[73] Assignee: Starburst Communications Corporation, Concord, Mass.

Reexamination Request:
No. 90/005,028, Jun. 26, 1998

Reexamination Certificate for:
Patent No.: 5,553,083
Issued: Sep. 3, 1996
Appl. No.: 08/375,493
Filed: Jan. 19, 1995

[51] Int. Cl.$^7$ ........................................ H04L 1/16
[52] U.S. Cl. ............................................. 714/748
[58] Field of Search ................................... 714/748, 749

[56] References Cited

U.S. PATENT DOCUMENTS

| | | | |
|---|---|---|---|
| 4,493,021 | 1/1985 | Agrawal et al. | 364/200 |
| 4,554,656 | 11/1985 | Budrikis et al. | 370/85 |
| 4,759,015 | 7/1988 | Takai et al. | 370/86 |
| 4,888,767 | 12/1989 | Furuya et al. | 370/95.2 |
| 4,914,654 | 4/1990 | Matsuda et al. | 370/94.1 |
| 4,937,819 | 6/1990 | King | 370/95.3 |
| 5,296,936 | 3/1994 | Pittas et al. | 358/407 |
| 5,519,834 | 5/1996 | Kamerman et al. | 395/200.06 |
| 5,553,083 | 9/1996 | Miller | 371/32 |
| 5,572,678 | 11/1996 | Homma et al. | 395/200.12 |
| 5,727,002 | 3/1998 | Miller et al. | 371/32 |

FOREIGN PATENT DOCUMENTS

| | | |
|---|---|---|
| 0 303 830A2 | 2/1989 | European Pat. Off. |
| 0 437 072 A1 | 7/1991 | European Pat. Off. |
| 0 552 794 A2 | 7/1993 | European Pat. Off. |
| 91/13503 | 2/1991 | WIPO |
| 95/26088 | 10/1995 | WIPO |

OTHER PUBLICATIONS

International Searching Authority/European Patent Office, International Search Report, Dec. 5, 1996.

International Searching Authority/European Patent Office, Invitation to Pay Additional Fees and Partial International Search Report, Jul. 22, 1996.

Draft Standard 802.1E, System Load Protocol, ANSI and Joint Technical Committee of the ISO and the IEC, 1990, 64 pages.

Comer, Internetworking with TCP/IP, vol. I, Principles, Protocols, and Architecture, Second Edition, Prentice Hall, 1991, Chapter 23, pp. 377–390.

Waters et al., Broadcast File Distribution Protocols for Satellite Networks, IEEE Telecommunications Conference pp. 133–138, 1989.

Henriksen et al., A Transport Protocol Supporting Multicast File Transfer Over Satellite Links, International Phoenix Conference on Computers and Communications, pp. 590–596, 1992.

"IBM Japan Develops New Communication Protocol", news article, Nov. 3, 1995.

"TRIView Manger" brochure by Tactix ReEngineering, four pages.

(List continued on next page.)

Primary Examiner—Stephen M. Baker

[57] ABSTRACT

A data transmission method quickly and reliably transmits data (e.g., a file) from a source to one or more recipients over a communications link. The method includes transmitting the data, which are in the form of a plurality of frames, from the source over the link to one or more of the recipients until all of the plurality of frames have been transmitted over the link. While the data are being transmitted by the source, acknowledgments from one or more of the recipients are received by the source. The acknowledgments indicate which frames require retransmission. After all of the frames have been transmitted over the link, a retransmission is performed by the source for only those frames which the acknowledgements indicate as requiring retransmission.

OTHER PUBLICATIONS

A New ARQ–Scheme for Multicast Satellite Communication, by U. Quernheim et al., 3rd European Conference On Satellite Communications, Nov. 1993, pp. 11–15.

Electronics Letters, vol. 24, No. 11, May 26, 1988, "Continuous Multidestination ARQ Schemes For High Error–Rate Channels", pp. 694–695.

Host Extensions for IP Multicasting, by S. Deering, Aug. 1989, pp. 1–17.

"The Internet Multicasting Service", RELease 1.0, v94, n2, p10(6), Feb. 18, 1994, Dialog printout.

IEEE Computer Society, Oct. 1994, "Multicast Transport Protocols For High Speed Networks", by S. Paul et al., pp. 4–14.

IEEE Transactions on Communications, vol. 41, No. 12, Dec. 1993, "Optimal Adaptive Multireceiver ARQ Protocols" by Wang et al., pp. 1816–1829.

IEEE Transactions of Communications, vol. Com–33, No. 3, Mar. 1985, "Multidestination Protocols for Satellite Broadcast Channels", by Sabnani et al., pp. 232–240.

IEEE Transactions on Communications, vol. 41, No. 5, May 1993, "Error and Flow Control Performance of a High Speed Protocol", B. Doshi et al., pp. 707–720.

Stanford University, "Host Extensions for IP Multicasting", S. Derring, Aug. 1989, pp. 1–17.

Shacham, "Multipoint Communication by Hierarchically Encoded Data", INFOCOM 1992, pp. 2107–2114.

Shachum, "Multicast Routing of Hierarchical Data", 1992, pp. 1217–1221.

Bhagwat et al., "Effect of Topology on Perormance of Reliable Multicast Communications", INFOCOM '94, pp. 602–609, Dec. 1994.

International Organization for Standarization (ISO) and the International Electrotechnical Commission (IEC). "ISO/IEC CD 8802–1E–Information Technology—Telecommunications and Information Exchange Between Systems—Local Area Networks—Part 1: General Introduction—Section E: System Load Protocol," Mar. 25, 1990.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 6–8 are cancelled.

Claims 1–5, 9 and 10 are determined to be patentable as amended.

1. A method for transmitting data over a communications link, comprising:
   (A) partitioning the data into a plurality of blocks, each block [including] *comprising* a plurality of [frames] *packets and each packet comprising one or more bits, the partitioning comprising setting the number of packets per block to be approximately equal to the maximum number of available bits per packet*;
   (B) transmitting, *block by block,* all of the [frames] *packets in each of the blocks* to one or more recipients;
   (C) during transmission, receiving, [acknowledgements from the recipients which include indications of frames requiring retransmission], *from one or more of the recipients, indications of packets in the transmitted block that require retransmission, each indication associated with a different one of the recipients and comprising a bitmap contained within one of the packets, wherein the bitmap comprises a number of bits equal to the maximum number of available bits in the packet, and each bit of the bitmap represents a different one of the packets in the transmitted block*; and
   (D) [repeating steps (B), (C), and (D) for] *retransmitting* only those [frames which the acknowledgements indicate require] *packets requiring* retransmission *by repeating steps (B), (C), and (D)*.

2. [A method for quickly and reliably transmitting data to at least two recipients over a communications link comprising:
   (A) transmitting a plurality of frames of data over the link to the recipients until all of the plurality of frames have been transmitted;
   (B) while performing step (A), receiving acknowledgments from one or more of the recipients; the acknowledgments including indications of frames requiring retransmission; and
   (C) after all of the plurality of frames have been transmitted, repeating for] *The method of claim 1 wherein step (D) comprises repeating steps (B), (C),* and (D) a predetermined number of times [steps (A), (B), and (C) for only those frames which the acknowledgments indicate require transmission].

3. [A method for quickly and reliably transmitting data to at least two recipients over a communications link comprising;
   (A) transmitting a plurality of frames of data over the link to the recipients until all of the plurality of frames have been transmitted;
   (B) while performing step (A), receiving acknowledgments from one or more of the recipients, the acknowledgments including indications of frames requiring retransmission; and
   (C) after all of the plurality of frames have been transmitted repeating until] *The method of claim 1 wherein step (D) comprises repeating steps (B), (C), and (D) for* a predetermined amount of time [has passed steps (A), (B), and (C) for only those frames which the acknowledgments indicate require transmission].

4. [A method for quickly and reliably transmitting data to at least two recipients over] *The method of claim 1 wherein the link includes* the Internet[, comprising:
   (A) transmitting a plurality of frames of data over the Internet to the recipients until all of the plurality of frames have been transmitted:
   (B) while performing step (A), receiving acknowledgments from one or more of the recipients, the acknowledgments including indications of frames requiring retransmission; and
   (C) after all of the plurality of frames have been transmitted, repeating steps (A), (B), and (C) for only those frames which the acknowledgments indicate require retransmission].

5. [A method for quickly and reliably transmitting data to at least two recipients over ] *The method of claim 1 wherein the link includes* a cellular network[, comprising:
   (A) transmitting a plurality of frames of data over the cellular network to the recipients until all of the plurality of frames have been transmitted;
   (B) while performing step (A), receiving acknowledgments from one or more of the recipients, the acknowledgments including indications of frames requiring transmission; and
   (C) after all of the plurality of frames have been transmitted, repeating steps (A), (B), and (C) for only those frames which the acknowledgments indicate require retransmission].

9. The method of claim [8] *1* wherein step (B) further comprises transmitting the [frames] *packets* at a predetermined rate.

10. The method of claim 9 further comprising determining which, if any, recipients are not acknowledging transmissions and then adjusting the predetermined rate based on that determination in order to increase *the* recipients' [transmission acknowledgment] *receipt of packets*.

* * * * *